United States Patent
Ly et al.

(10) Patent No.: US 9,623,501 B2
(45) Date of Patent: Apr. 18, 2017

(54) ABRASIVE SAWING WIRE, PRODUCTION METHOD THEREOF AND USE OF SAME

(71) Applicants: COMMISSARIAT A L'ENERGIE ATOMIQUE ET AUX ENERGIES ALTERNATIVES, Paris (FR); Thermocompact, Metz-Tessy (FR)

(72) Inventors: Michel Ly, Annecy (FR); Gérald Sanchez, Dingy Saint Clair (FR); Xavier Weber, Annecy (FR)

(73) Assignees: Commissariat A L'Energie Atomique Et Aux Energies Alternatives, Paris (FR); Thermocompact, Metz-Tessy (FR)

( * ) Notice: Subject to any disclaimer, the term of this patent is extended or adjusted under 35 U.S.C. 154(b) by 0 days.

(21) Appl. No.: 14/786,490

(22) PCT Filed: Apr. 15, 2014

(86) PCT No.: PCT/FR2014/050911
§ 371 (c)(1),
(2) Date: Oct. 22, 2015

(87) PCT Pub. No.: WO2014/184457
PCT Pub. Date: Nov. 20, 2014

(65) Prior Publication Data
US 2016/0121413 A1 May 5, 2016

(30) Foreign Application Priority Data
May 14, 2013 (FR) ..................... 13 54310

(51) Int. Cl.
*B28D 5/00* (2006.01)
*B23D 61/18* (2006.01)
(Continued)

(52) U.S. Cl.
CPC ........... *B23D 61/185* (2013.01); *B23D 65/00* (2013.01); *B24D 11/00* (2013.01);
(Continued)

(58) Field of Classification Search
CPC ...... B23D 61/185; B23D 65/00; B24D 11/00; B24D 18/0018; B28D 5/04; C25D 7/0607; C25D 15/00
(Continued)

(56) References Cited

U.S. PATENT DOCUMENTS 4,435,189 A * 3/1984 Bovenkerk ......... C23C 18/1635
427/217
4,674,474 A * 6/1987 Baril .................... B23D 61/185
125/18

(Continued)

FOREIGN PATENT DOCUMENTS

EP 2428317 A2 3/2012
EP 2572818 A1 3/2013
(Continued)

Primary Examiner — George Nguyen
(74) Attorney, Agent, or Firm — St. Onge Steward Johnston & Reens, LLC

(57) ABSTRACT

An abrasive wire including a steel core and an outer coating including a binder and abrasive particles, the binder being formed by at least one nickel-cobalt alloy layer having a cobalt content of between 20 wt.-% and 85 wt.-% in relation to the weight of the Ni/Co alloy.

11 Claims, 1 Drawing Sheet

(51) Int. Cl.
*B23D 65/00* (2006.01)
*B24D 18/00* (2006.01)
*B24D 11/00* (2006.01)
*B28D 5/04* (2006.01)
*C25D 7/06* (2006.01)
*C25D 15/00* (2006.01)

(52) U.S. Cl.
CPC ........... *B24D 18/0018* (2013.01); *B28D 5/04* (2013.01); *C25D 7/0607* (2013.01); *C25D 15/00* (2013.01)

(58) Field of Classification Search
USPC .............................................. 125/21; 51/307
See application file for complete search history.

(56) References Cited

U.S. PATENT DOCUMENTS

| | | | | |
|---|---|---|---|---|
| 5,024,680 | A * | 6/1991 | Chen | C09K 3/1445 51/293 |
| 5,791,330 | A | 8/1998 | Tselesin | |
| 7,435,276 | B2 * | 10/2008 | Chen | B23D 61/18 428/403 |
| 8,573,330 | B2 * | 11/2013 | Mourik | C22C 26/00 175/405.1 |
| 8,579,053 | B2 * | 11/2013 | Bellin | C22C 26/00 175/405.1 |
| 8,870,985 | B2 * | 10/2014 | Wang | C09K 3/1409 51/295 |
| 9,028,948 | B2 * | 5/2015 | Tian | B23D 61/185 125/21 |
| 9,409,243 | B2 * | 8/2016 | Tian | B23D 65/00 |
| 2001/0008190 | A1 * | 7/2001 | Scott | B22F 7/06 175/374 |
| 2004/0107648 | A1 * | 6/2004 | Sung | B28D 1/124 51/295 |
| 2012/0216787 | A1 * | 8/2012 | Morita | B23K 35/262 125/21 |
| 2013/0061535 | A1 * | 3/2013 | Tian | B23D 61/185 51/309 |
| 2013/0084786 | A1 | 4/2013 | Rehrig et al. | |
| 2013/0133957 | A1 * | 5/2013 | Belnap | E21B 10/46 175/432 |
| 2014/0013675 | A1 * | 1/2014 | Tian | B24D 3/007 51/309 |

FOREIGN PATENT DOCUMENTS

FR 1253017 A 2/1961
WO 2010092151 A1 8/2010

* cited by examiner ary layer, document EP
ABRASIVE SAWING WIRE, PRODUCTION METHOD THEREOF AND USE OF SAME

FIELD OF THE INVENTION

The invention relates to an abrasive wire comprising a steel core and abrasive particles maintained on the core by means of a binder based on a Ni/Co alloy.

The field of use of the present invention particularly concerns the sawing of materials such as silicon, sapphire, or silicon carbide.

BACKGROUND OF THE INVENTION

Generally, the cutting of hard materials such as silicon wafers may be performed by means of a wire (steel) having abrasive particles (diamond, for example) at its periphery.

To solve possible wire breaks, prior art advocates the use of a steel wire having a high carbon content.

Abrasive particles are bonded to the wire by means of a resin or metal binder layer. Such a binder maintains the particles at the surface of the wire to give abrasive properties thereto.

Generally, and conversely to the binder, the particles are made of a material harder than the material to be cut.

Indeed, on first use of the wire, the binder is partly eroded to expose the abrasive particles. The sawing of the material is then performed by repeated passages of the cutting wire on the surface of the material to be cut, that is, by friction of the protruding portions of the abrasive particles on the material.

Once the protruding portions of the abrasive particles have been exposed, the binder no longer comes in direct contact with the material to be cut. However, it may wear according to the two following mechanisms:

by mechanical deformation: on sawing of a material, the abrasive particles are alternately pushed forward and backward and along the main direction of the wire. This motion is the direct consequence of the friction with the material being cut. Thus, the binder deforms a little for each movement. At the end of the cutting, the binder may be locally too deformed to efficiently retain the abrasive particles at the surface of the wire.

by abrasion/erosion: this mechanism results from the presence of fragments of the material to be cut located between the binder—which displaces along with the wire—and the material to be cut. Due to the sawing movements, the fragments of material erode the binder, with, as a consequence, a progressive decrease of its thickness. At the end of the cutting, the binder is no longer thick enough to efficiently retain the abrasive particles at the surface of the wire. The abrasive particles detach, which progressively decreases the abrasive power of the wire and thus its ability to cut a material.

Generally, mechanical deformation is a stronger phenomenon than the abrasion of the binder.

To delay or even to suppress the deterioration of the abrasive properties of the wire, binders based on metal alloys have been developed. They appear to have better hardness properties than a resin.

Thus, to limit the wearing of the wire, a binder based on a nickel and phosphorus alloy may be used. The binder is chemically deposited at the wire surface to cover abrasive grains. Further, its hardness is greater than that of pure nickel.

To limit the cracking of the bonding layer, document EP 2 428 317 advocates limiting the sulfur, oxygen, and hydrogen contents in the electrolytic nickel deposit.

Finally, to solve possible wire breaks, prior art advocates the use of a steel wire having a high carbon content. However, steel wires are sensitive to corrosion, in particular when there exists an electrolytic contact between the steel and a nobler metal, such as copper, nickel, or cobalt. This electrolytic contact may be created when the binder is cracked and the wire is in contact with water. Such conditions are sometimes met during the cutting operation. The wire is stretched (and its bonding metal layer may then crack) and it is sprayed with water.

There however is a need to develop alternatives to such binders, especially to ensure the maintaining of the abrasive grains on the core of an abrasive wire, but also to control the wearing of the binder. The present invention aims at solving this technical problem.

SUMMARY OF THE INVENTION

The Applicants have developed a wire having the abrasive particles maintained by means of a binder at its surface.

Further, the binder protects the core of the wire from a premature wearing on use thereof. Its specific composition enables to improve the resistance to mechanical deformation, but also the resistance to abrasion during cutting operations, and this, while minimizing abrasive particle losses.

Thus, the binder simultaneously has properties of hardness and resistance to abrasion.

More specifically, the object of the present invention is an abrasive wire comprising a steel core and an external coating comprising a binder and abrasive particles, said binder being formed of at least one layer of nickel/cobalt alloy having a cobalt content in the range from 20% to 85% by mass with respect to the mass of the Ni/Co alloy, advantageously from 37 to 65%.

As already indicated, the binder enables to maintain the abrasive particles at the periphery of the steel core. Thus the abrasive particles essentially have no degree of liberty on said core. Advantageously, the particles have no degree of liberty on the steel core, particularly on use of the abrasive wire according to the invention.

Indeed, the Ni/Co alloy having a cobalt content in the range from 20 to 85% by mass provides a better hold of the particles on the core than prior art resin binders. It has properties of hardness and resistance to abrasion enabling to more efficiently maintain the particles in place, even on use of the wire during cutting operations.

The abrasive particles may be in direct contact with the steel core, but they may also advantageously be separated from the core by a thin binder layer. This is in particular true when using the method described in FIG. 1.

The binder at least partially covers the abrasive particles.

Preferably, the binder should not crack during the wire use. In other words, when the wire is stretched, at its maximum stress limit, the surface of the binder should not crack.

According to a specific embodiment, the external coating comprises at least one additional binder layer made of a Ni/Co alloy, having a cobalt content in the range from 20% to 85% by mass, advantageously from 37 to 65%. The binder should thus appear in the form of a single layer or of a plurality of layers, advantageously two layers.

"Layer" means a sheath of the wire, of homogeneous composition. Thus, two layers can be distinguished from each other by the difference between their chemical compositions, or by the presence of abrasive in one of them only.

The binder layers may be made of Ni/Co alloys different from one another.

The first binder layer, in contact with the steel core, may have a hardness greater than that of the additional layers to maintain the abrasive particles on the wire.

However, the additional binder layer(s) (external layer(s)) are advantageously highly resistant to abrasion, but also ductile to avoid the cracking of the binder on mechanical tensioning of the wire. For this purpose, it is preferable for the external binder layer to have a sufficient ductility. On this regard, it can be observed whether the ductility of the external layer is sufficient by submitting the wire to a simple traction test, until it breaks. The sufficiently ductile external layer is generally entirely continuous, except in the striction areas on either side of the break.

According to a specific embodiment, the abrasive wire comprises a steel core and an external coating comprising a binder and abrasive particles. The binder is formed, in this specific case, of two binder layers may of a nickel/cobalt alloy, having a cobalt content in the range from 20% to 85% by mass with respect to the mass of the Ni/Co alloy (independently from one layer to the other). The second binder layer which covers the first binder layer adjacent to the steel core is made of a Ni/Co alloy containing more cobalt than the first binder layer. Thus, the external binder layer (second layer) has better abrasion resistance properties due to the high cobalt percentage. Further, the first layer has better hardness properties than the binder alloy of the second layer due to its adapted composition.

According to another specific embodiment, the hardness of the Ni/Co alloy binder may be improved by introduction of sulfur. This may in particular be implemented according to the method described hereafter, by introduction of sodium saccharin ($C_7H_4NO_3S$, Na, $2H_2O$) into the electrolyte bath enabling to form the binder layer.

Thus, the Ni/Co alloy may contain from 100 to 1,000 wt·ppm (parts per million) of sulfur, preferably from 300 to 700 wt·ppm.

Preferably, only the first binder layer contains sulfur. Indeed, the addition of sulfur increases the binder hardness, but it decreases its ductility. A high sulfur content of the external layer may cause a cracking of the coating when the wire is stretched in the cutting area. Such a cracking lets water pass, and it places the steel of the wire core in electrolytic contact with the binding metal. A corrosion of wire core ensues. The wire becomes progressively impossible to use.

The binder, be it monolayer or multilayer, may in particular be obtained by successive electrodepositions of Ni/Co alloys.

The alloy forming each of the binding layers advantageously has a hardness in the range from 300 and 800 Hv, advantageously from 300 to 500 Hv.

The hardness of a binding metal layer is measured by means of a micro-hardness tester according to techniques within the general knowledge of those skilled in the art. A Vickers indenter is generally used, with a load compatible with the layer thickness. Such a load is generally in the range from 1 gram-force to 100 grams-force. If the mark left by the Vickers indenter is too large with respect to the layer thickness (even with a small load), a Knoop indenter (narrower) may be used, and the Knoop hardness value may be converted into Vickers hardness, by means of a conversion table.

The abrasive particles enabling to cut materials may in particular be made of a material selected from the group comprising silicon carbide SiC; silica $SiO_2$; tungsten carbide WC; silicon nitride $Si_3N_4$; cubic boron nitride cBN; chromium dioxide $CrO_2$; aluminum oxide $Al_2O_3$; diamond; and diamonds pre-coated with nickel, iron, cobalt, copper, or titanium, or with alloys thereof.

According to a specific embodiment, the abrasive wire may comprise several different types of abrasive particles.

It will be within the abilities of those skilled the art to select the adequate binder/abrasive particle combination according to the material to be cut.

According to a specific embodiment, the abrasive particles are formed of grains covered with a film, which may be different from the binder. The film at least partially covers each grain, advantageously integrally. The materials covering the diamond grains are for example nickel, cobalt, iron, copper, or titanium.

The total diameter of the particles, that is, of the grain, and possibly of the film, is advantageously in the range from 1 micrometer to 500 micrometers. It is preferably smaller than one third of the diameter of the steel core. Thus, according to a specific embodiment, the particle diameter may be in the range from 10 to 22 for a core having a 0.12-mm diameter.

Diameter means the largest diameter (or the largest dimension) of the particles when they are not spherical.

Advantageously, the film covering the grain is made of a ferromagnetic material at the abrasive wire manufacturing temperature (electrodeposition of the abrasive particles—see the method described hereafter). Nickel, iron, and cobalt are examples thereof. Such metals may be alloyed, and they may also contain hardening elements such as sulfur and phosphorus. It should be noted that phosphorus decreases the ferro-magnetism of nickel and that, in this case, the concentration thereof should be limited.

Further, the material forming the film is advantageously electrically conductive.

The film at least partially covers the abrasive particles, advantageously integrally. However, during the use of the abrasive wire according to the invention, the grain portion in contact with the material to be cut comprises no film, the latter being eroded from as soon as the first cutting operations, in the same way as the binder.

The mass of the film, relative to the total mass of the coated grains, is advantageously in the range from 10% to 60%, in the case of diamond grains.

The film may in particular be deposited on the grains prior to the use of the abrasive grains/particles in the film manufacturing method. Techniques which may be implemented for the deposition of a film on each of the grains especially include cathode sputtering, but also electrolysis, chemical vapor deposition (CVD), and electroless nickel plating.

It can generally be observed that from 5 to 50% of the surface area of the abrasive wire is occupied by abrasive particles (possibly covered with a binder layer, when the wire is new).

Generally, the steel core of the abrasive wire according to the invention is a wire having a circular transverse cross-section. It is a steel wire having a diameter advantageously in the range from 70 micrometers to 1 millimeter.

It will be within the abilities of those skilled in the art to adapt the core diameter according to the material to be cut. Thus, a core having a diameter in the range from 200 micrometers to 1 millimeter is particularly adapted to cut silicon bricks in ingots. However, a core having a diameter in the range from 70 to 200 micrometers is particularly adapted to cut silicon wafers in bricks.

The core of the abrasive wire generally appears in the form of a wire having a resistance to traction advantageously greater than 2,000 or 3,000 MPa, but, generally, smaller than 5,000 MPa.

On the other hand, the core may have an elongation at break, that is, the increase of the length of the core before it breaks, advantageously greater than 1%, more advantageously still greater than 2%. However, it remains preferably smaller than 10 or 5%.

Advantageously, the wire core is made of an electrically-conductive material, that is, a material having a resistivity lower than $10^{-5}$ ohm·m at 20° C., and particularly steel.

The steel core may in particular be made of a material selected from the group comprising carbon steel, ferritic stainless steel, austenitic stainless steel, and brass-plated steel. Carbon steel preferably contains from 0.6 to 0.8% by mass of this element.

The present invention also relates to a method of manufacturing the above-described abrasive wire. The method especially comprises the steps of:

electrodeposition on a steel core (steel wire) of a coating comprising a binder and abrasive particles, possibly magnetic, said binder being made of a nickel/cobalt alloy having a cobalt content in the range from 20% to 85% by mass relative to the mass of the Ni/Co alloy, by passing in an electrolyte bath ($B_1$) comprising at least cobalt II and nickel II ions, and abrasive particles;

optionally, electrodeposition of an additional binder layer by passing in an electrolyte bath ($B_2$) comprising at least cobalt II and nickel II ions, said additional layer being made of a Ni/Co alloy having a cobalt content in the range from 20% to 85% by mass.

In practice, $Co^{2+}$ and $Ni^{2+}$ ions are generally introduced. However, other degrees of oxidation may coexist, but they are generally by a very small concentration minority in electrolyte baths.

Advantageously, the method may comprise at least one of the following steps, before the electrodeposition:
degreasing of the steel core in an alkaline medium;
pickling of the steel core in an acid medium.

When this method comprises a second electrodeposition of cobalt and nickel alloy, bath ($B_2$) may have a nickel and cobalt ion composition different from that of bath ($B_1$). This bath advantageously comprises no abrasive particles.

According to a specific embodiment, the second layer may be made of pure cobalt, a metal with a good abrasion resistance.

As already indicated, the binder may comprise at least two layers. The possible layer(s) covering the second layer may be obtained either by repeating the passing in the second bath ($B_2$), or by passing in at least another electrolytic bath comprising Co II and Ni II ions.

Typically, baths ($B_1$) and ($B_2$), and, possibly, the other baths, comprise, independently from one another, from 1 to 150 g/L of cobalt II ion and from 50 to 150 g/L of nickel II ions.

On the other hand, bath ($B_1$) comprises from 1 to 100 g/L of abrasive particles.

As already indicated, the binder hardness may also be improved by incorporation of sulfur in the first binder layer and/or possibly in at least one of the additional layers. Preferably, it is not the external layer.

Thus, the sulfur may in particular be introduced by addition of sodium saccharin ($C_7H_4NO_3S$, Na, $2H_2O$) in the electrolyte bath enabling to form the binder. The introduced quantity may be in the range from 1 to 10 g/L, advantageously in the order of 5 g/L.

As already mentioned, for further details relative to the method steps as well as to the device used, reference should be made to the patent application filed under number FR 12 53017.

The invention also relates to the use of the above-described abrasive wire, to saw a material capable of being selected, in particular, from the group comprising silicon, sapphire, and silicon carbide. The abrasive wire may be used in the context of silicon wafer manufacturing.

It will be within the abilities of those skilled in the art to adapt the abrasive wire according to the material to be cut. More particularly, the abrasive particles are selected to be harder than the material to be cut.

The invention and the resulting advantages will better appear from the following non-limiting drawings and examples, provided as an illustration of the invention.

DETAILED DESCRIPTION OF THE INVENTION

Figure 1:
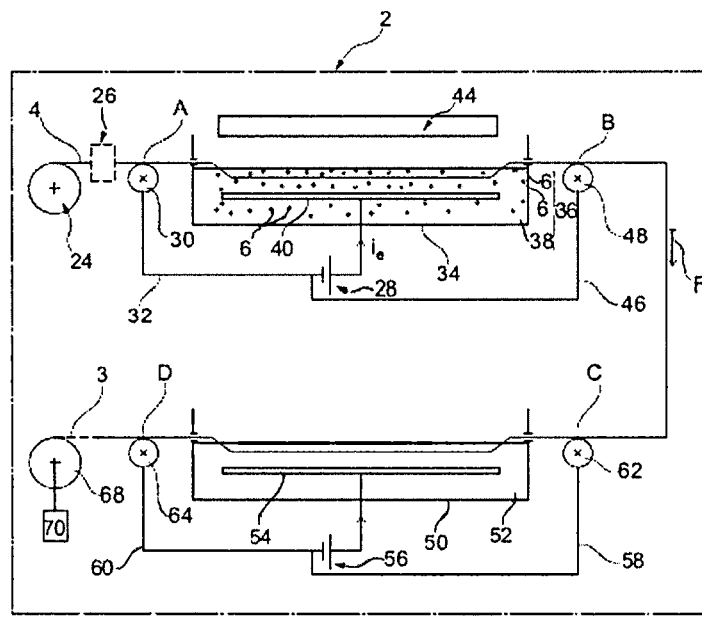
FIG. 1 illustrates a device enabling to obtain the abrasive wire according to a specific embodiment of the invention.

The device (2) illustrated in FIG. 1 enables to implement a specific embodiment of the electrodeposition method on a steel wire (4) to prepare the abrasive wire (3) according to the present invention.

The method especially comprises the steps of:
unwinding a steel core (4) (steel wire) stored in the form of a coil (24), along the direction of arrow F;
optionally, degreasing steel core (4) in an alkaline medium;
optionally, pickling steel core (4) in an acid medium;
optionally, passing steel core (4) through a magnetization device (26) which applies a magnetic field, having an intensity advantageously greater than 800 Nm. Core (4) is thus permanently magnetized;
electrodepositing on the steel core a coating comprising a binder and abrasive particles, said binder being a nickel/cobalt alloy having a cobalt content in the range from 20% to 85% by mass relative to the mass of the Ni/Co alloy, by passing in a bath ($B_1$) (36) of electrolyte (38) comprising at least cobalt II and nickel II ions, and abrasive particles (6);
optionally, electrodepositing a second bonding layer by passing in a bath ($B_2$) of electrolyte (52) comprising at least cobalt II and nickel II ions.
obtaining abrasive wire (3);
optionally storing abrasive wire (6), advantageously in the form of a coil (68) by means of a motor (70).

The device (2) used comprises a source (28) which generates an electrolysis current $i_e$. The positive terminal of source (28) is connected to electrode (40) located in bath ($B_1$) (36) of electrolyte (38) which is contained in vessel (34). The negative terminal of source (28) is connected to two conductive pulleys (30) and (48) arranged on either side of vessel (34) via electric conductors (32) and (46). The two conductive pulleys (30) and (48) enable to provide two points (A) and (B) of mechanical contact with steel core (4) which is thus connected to the negative terminal of source (28).

Advantageously, two current sources (28A and 28B) may be used. Their respective negative terminals are connected together to conductive pulleys (30) and (48).

The positive terminal of generator (28A) is connected to an anode (40A) made of nickel.

The positive terminal of generator (28B) is connected to an anode (40B) made of cobalt.

Assuming that the cobalt content in the nickel and cobalt alloy deposit should be 20%, it is preferably to have 20% of the current flow through the generator (28B) connected to the cobalt anode (40B), and 80% of the current flow through the generator (28A) connected to the nickel anode (28A). For more clarity, FIG. 1 shows a device comprising a single electric current generator, and a single anode in bath ($B_1$) (36).

Optionally, device (2) further comprises a device (44) for magnetizing abrasive particles (6) and steel core (4) once it is immersed in bath ($B_1$) (36). It is positioned above bath ($B_1$) (36).

Optionally the abrasive particles used are magnetic to allow the electrodeposition of the external coating on the steel core. They can thus be attracted by the steel core, which is magnetized during this process.

As already mentioned, the magnetic properties of the abrasive particles may in particular originate form a magnetic film covering them.

The steel core is thus covered with a coating made of binder and of abrasive particles by electrodeposition on passing in the bath ($B_1$).

According to a specific embodiment, a second binder layer may then be deposited on the steel core, by passing through second bath ($B_2$) (52).

Second bath ($B_2$) (52) which is contain in vessel (50), comprises an electrolyte. It advantageously comprises no abrasive particles.

The step of electrodeposition of the second binder layer comprises, in particular, immersing the steel core covered with a first binder layer and with abrasive particles, in a bath having an electrode (54) connected to the positive terminal of a second current source (56) arranged therein.

The negative terminal of second current source (56) is connected to two conductive pulleys (62) and (64) arranged on either side of vessel (50) containing second bath ($B_2$) (52) via electric conductors (58) and (60).

Advantageously, two current sources (56A and 56B) may be used. Their respective negative terminals are connected together to conductive pulleys (62) and (64).

The positive terminal of generator (56A) is connected to an anode (54A) made of nickel.

The positive terminal of generator (56B) is connected to an anode (54B) made of cobalt.

Assuming that the cobalt content in the nickel and cobalt alloy deposit should be 85%, it would be advantageous to have 85% of the current flow through generator (56B) connected to the cobalt anode (54B), and 15% of the current flow through generator (56A) connected to the nickel anode (54A). For more clarity, FIG. 1 shows a device comprising a single electric current generator, and a single anode in bath ($B_2$) (52).

Conductive pulleys (62) and (64) provide the connection between steel core (4) and the negative terminal of second current source (56) at contact points (C) and (D).

After the passing through the second electrolyte bath, abrasive wire (3) is obtained. It may be stored in the form of a coil (68).

As already indicated, device (2) is described in further detail in the patent application filed under number FR 12.53017.

Figure 2:
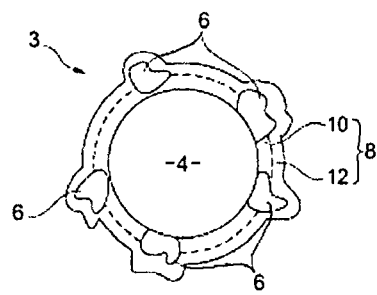
FIG. 2 illustrates a cross-section view of the abrasive wire according to a specific embodiment of the invention.

As shown in FIG. 2, abrasive wire (3) according to the invention has a core (4) coated with a first binder layer (10) partially covering abrasive particles (6).

According to this specific embodiment, the abrasive wire further comprises a second binder layer (12) covering abrasive particles (6). This second binder layer advantageously has a better abrasion resistance than the first layer. On the other hand, the second binder layer (12) is advantageously less hard and more ductile than the first layer (10) covering the steel core (4).

The two layers (10) and (12) and abrasive particles (6) form external coating (8) of abrasive wire (3).

Figure 3:
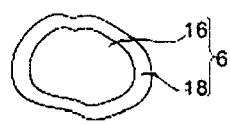
FIG. 3 illustrates a cross-section view of an abrasive particle of the abrasive wire according to a specific embodiment of the invention.

According to a specific embodiment, abrasive particle (6) comprises an abrasive grain (16) covered with a film (18) (FIG. 3). The film is advantageously made of a magnetic material to ease the electrodeposition of the particles on steel core (4). Indeed, the electrodeposition of the external coating is advantageously implemented in the presence of magnetic particles.

Embodiments of the Invention

A plurality of abrasive wires (examples 1-9) have been prepared from a steel core in the hardened state. The steel core comprises 0.8% of carbon, it has a 0.12-millimeter diameter.

Operating procedure:
The wires have been prepared according to the steps of:
(1) degreasing the steel core in an alkaline medium;
(2) pickling the steel core in an acid medium;
(3) electrodeposition by passing the steel core in a first electrolyte bath ($B_1$) comprising abrasive particles, to form a first external layer;
(4) optionally, second electrodeposition by passing the steel core in a second electrolyte bath ($B_2$), to form a second external layer.

The respective compositions of electrolyte baths ($B_1$) and ($B_2$) have been adjusted according to the examples. The baths are water-based.

For example, electrolyte bath ($B_1$) according to example 9 contains:
100 g/L of $Ni^{2+}$ in the form of nickel sulfamate and of nickel chloride;
4 g/L of $Co^{2+}$ in the form of cobalt sulfamate;
15 g/L of $Cl^-$ in the form of nickel chloride;
35 g/L of $H_3BO_3$ (boric acid);
2 mL/L of wetting agent UNW 89 (Mc Dermid), formed, among others, of sodium lauryl sulfate;
20 g/L of pre-nickel plated diamonds having a diameter from 12 to 22 micrometers and containing approximately 50% by mass of nickel.

The pH of this bath ($B_1$) is adjusted to 3.8 by addition of sulfamic acid.

Electrolyte bath ($B_2$) according to example 9 contains:
100 g/L of $Ni^{2+}$ in the form of nickel sulfamate and of nickel chloride;
30 g/L of $Co^{2+}$ in the form of cobalt sulfamate;
15 g/L of $Cl^-$ in the form of nickel chloride;
35 g/L of $H_3BO_3$ (boric acid).

The pH of this bath ($B_2$) is adjusted to 3.8 by addition of sulfamic acid.

The conditions of the treatment of the steel core in baths ($B_1$) and ($B_2$) are identical and are the following:
- temperature: 55° C.;
- wire speed: 5 m/min;
- current density: 2 A/dm².

The wires according to examples 1 to 8 of table 1 have been prepared according to steps (1) to (3) of this operating procedure by adjusting the quantity of cobalt and nickel. Only the passing in bath ($B_1$) has been carried out.

However the wire according to example 9 has been prepared according to steps (1) to (4) of the operating procedure. The binder of this wire is thus formed of two layers.

Results:

The hardness of the binder layers of the wires according to examples 1-9 have been measured according to known techniques (Vickers micro-hardness).

The abrasion resistance of the binder layers is estimated from plates on which they have been previously deposited (in the same electrochemical conditions as for abrasive wires). The wafers have been placed in a hard stainless steel ball tribometer, in dry conditions, with no lubrication. The volume of eroded deposit has been observed. A small eroded volume corresponds to a good abrasion resistance.

The experimental conditions implemented to prepare the wires according to examples 1-9 are specified in the following table. They especially comprise:
- the respective $Ni^{2+}$ and $Co^{2+}$ ion concentrations in the electrolyte, in grams per liter;
- the cobalt concentration in the deposit (binder)—the rest being made of nickel and of traces of oxygen, hydrogen, and sulfur;
- the hardness of the deposit, expressed in Vickers (Hv);
- the resistance to abrasion of the deposit against a hard steel part.

The wires according to examples 1-8 have a single binder layer having a thickness equal to 8 micrometers.

The wire according to example 9 has a first binder layer with a thickness equal to 8 micrometers, and a second binder layer with a thickness also equal to 8 micrometers.

TABLE 1

Hardness and abrasion resistance of abrasive wires according to the invention (INV) and counterexamples (CE).

| Examples | | $Ni^{2+}$ (g/l) | $Co^{2+}$ (g/l) | Cobalt in deposit (% by mass) | Hardness of deposit (Hv) | Abrasion resistance of deposit |
|---|---|---|---|---|---|---|
| 1 (CE) | | 100 | 0 | 0 | 250 | poor |
| 2 (CE) | | 100 | 2 | 10 | 280 | poor |
| 3 (INV) | | 100 | 4 | 20 | 300 | average |
| 4 (INV) | | 100 | 10 | 37 | 350 | average |
| 5 (INV) | | 100 | 15 | 65 | 350 | average |
| 6 (INV) | | 100 | 30 | 85 | 300 | good |
| 7 (CE) | | 0 | 100 | 100 | 250 | good |
| 8$^{(i)}$ (INV) | | 100 | 4 | 20 | 500 | Good, but low ductility |
| 9$^{(ii)}$ (INV) | $B_1$ | 100 | 4 | 20 | 300 | good |
| | $B_2$ | 100 | 30 | 85 | 300 | not measured |

$^{(i)}$addition of 5 g/L of sodium saccharin, $C_7H_4NO_3$, Na, $2H_2O$ in bath $B_1$.

By SIMS (Secondary Ion Mass Spectrometry), $3.10^{19}$ atoms/cm³ of sulfur have been measured, that is, approximately 300 ppm (parts per million, by mass). Presence of cracks during the traction test on the wire according to example 8.

$^{(ii)}$ bilayer wire, deposition of two layers according to steps 1 to 4: The abrasion resistance of the external layer deposited in $B_2$ is good, the other has not been measured since it is the internal layer deposited by $B_1$.

It should be noted that the hardness is high when the cobalt content in the binder is in the range from 37% to 65%. At this concentration, the abrasion is significantly decreased with respect to a pure nickel deposit. The layers are ductile.

On the other hand, the abrasion is minimum for wires having a cobalt percentage in the binder at least equal to 85. The layers are ductile.

A good hardness/abrasion tradeoff is obtained when the cobalt percentage is in the range from 20 to 85, advantageously from 37 to 65.

The invention claimed is:

1. An abrasive wire comprising a steel core and an external coating comprising a binder and abrasive particles, said binder being formed of at least one layer of nickel/cobalt alloy having a cobalt content in the range from 20% to 85% by mass with respect to the mass of the Ni/Co alloy.

2. The abrasive wire of claim 1, wherein the Ni/Co alloy comprises from 37 to 65% by mass of cobalt.

3. The abrasive wire of claim 1, wherein the external coating comprises two layers of binder made of a Ni/Co alloy, having, independently from each other, a cobalt content in the range from 20% to 85% by mass.

4. The abrasive wire of claim 1, wherein the Ni/Co alloy contains sulfur.

5. The abrasive wire of claim 1, wherein the abrasive particles are made of a material selected from the group consisting of silicon carbide; silica; tungsten carbide; silicon nitride; boron nitride; chromium dioxide; aluminum oxide; diamond; and diamonds pre-coated with nickel, iron, cobalt, copper, or titanium, or with alloys thereof.

6. The abrasive wire of claim 1, wherein the abrasive particles are formed of grains at least partly covered with a film made of a ferromagnetic material.

7. A method of manufacturing the abrasive wire of claim 1, comprising the steps of:
   electrodeposition on a steel wire of a coating comprising a binder and abrasive particles, said binder being made of a layer of nickel/cobalt alloy having a cobalt content in the range from 20% to 85% by mass relative to the mass of the Ni/Co alloy, by passing in an electrolyte bath ($B_1$) comprising at least cobalt II and nickel II ions, and abrasive particles;
   optionally, electrodeposition of an additional binder layer by passing in an electrolyte batch ($B_2$) comprising at least cobalt II and nickel II ions, said additional layer being made of a Ni/Co alloy having a cobalt content in the range from 20% to 85% by mass.

8. The abrasive wire manufacturing method of claim 7, wherein the baths ($B_1$) and ($B_2$) comprise, independently from each other, from 1 to 150 g/L of cobalt II ions and from 50 to 150 g/L of nickel II ions.

9. The abrasive wire manufacturing method of claim 7, wherein the bath ($B_1$) comprises from 1 to 100 g/L of abrasive particles.

10. A use of the abrasive wire of claim 1, to saw a material selected from the group consisting of silicon, sapphire, and silicon carbide.

11. The abrasive wire of claim 4, wherein the Ni/Co alloy contains sulfur in an amount in the range from 100 to 1,000 wt·ppm.

* * * * *